(12) United States Patent
Hersh et al.

(10) Patent No.: US 9,207,671 B2
(45) Date of Patent: Dec. 8, 2015

(54) ERROR DIAGNOSTICS AND PROGNOSTICS IN MOTOR DRIVES

(71) Applicant: ROCKWELL AUTOMATION TECHNOLOGIES, INC., Mayfield Heights, OH (US)

(72) Inventors: Murray E. Hersh, Whitefish Bay, WI (US); Todd M. Oestreich, Cedarburg, WI (US); Gerry M. Nagel, Sussex, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 189 days.

(21) Appl. No.: 13/650,626

(22) Filed: Oct. 12, 2012

(65) Prior Publication Data

US 2014/0103848 A1    Apr. 17, 2014

(51) Int. Cl.
*G01R 31/00* (2006.01)
*G05B 23/02* (2006.01)

(52) U.S. Cl.
CPC .................................. *G05B 23/0278* (2013.01)

(58) Field of Classification Search
USPC ......... 318/490; 714/26, 46; 706/52; 702/185, 702/183; 701/33.7, 33.8, 33.4
See application file for complete search history.

(56) References Cited

U.S. PATENT DOCUMENTS

| | | | | |
|---|---|---|---|---|
| 4,866,712 A * | 9/1989 | Chao | ............................... | 714/704 |
| 5,351,247 A * | 9/1994 | Dow et al. | ........................ | 714/26 |
| 5,500,940 A * | 3/1996 | Skeie | ............................... | 714/25 |
| 5,572,424 A * | 11/1996 | Kellogg et al. | .............. | 701/33.7 |
| 6,324,659 B1 * | 11/2001 | Pierro | .............................. | 714/48 |
| 6,505,145 B1 * | 1/2003 | Bjornson | ....................... | 702/185 |
| 6,535,865 B1 * | 3/2003 | Skaaning et al. | ............... | 706/52 |
| 6,643,801 B1 * | 11/2003 | Jammu et al. | .................... | 714/37 |
| 7,209,815 B2 * | 4/2007 | Grier et al. | .................... | 701/29.1 |
| 7,409,594 B2 * | 8/2008 | Mukherjee et al. | ............. | 714/26 |
| 7,516,000 B2 * | 4/2009 | Grier et al. | ................... | 701/29.1 |
| 7,899,591 B2 * | 3/2011 | Shah et al. | .................... | 701/29.4 |
| 7,941,701 B2 * | 5/2011 | Wegerich et al. | ............... | 714/26 |
| 8,831,825 B2 * | 9/2014 | Shah et al. | ....................... | 701/36 |
| 2003/0196136 A1 * | 10/2003 | Haynes et al. | ................... | 714/13 |
| 2007/0220365 A1 * | 9/2007 | Castellani et al. | .............. | 714/46 |
| 2009/0037772 A1 * | 2/2009 | Wegerich et al. | ............... | 714/26 |
| 2009/0217101 A1 | 8/2009 | Becker | | |
| 2010/0076575 A1 | 3/2010 | Vasko et al. | | |
| 2011/0004589 A1 | 1/2011 | Rischar et al. | | |
| 2011/0140427 A1 | 6/2011 | Srivastava et al. | | |
| 2014/0019092 A1 * | 1/2014 | Phelps et al. | ................... | 702/185 |
| 2014/0040800 A1 | 2/2014 | Fredette et al. | | |

FOREIGN PATENT DOCUMENTS

| | | |
|---|---|---|
| EP | 1069487 | 1/2001 |
| EP | 1768007 | 3/2007 |
| EP | 2413274 | 2/2012 |

OTHER PUBLICATIONS

Extended European Search Report dated Feb. 12, 2014.

* cited by examiner

*Primary Examiner* — Rita Leykin
(74) *Attorney, Agent, or Firm* — Fletcher Yoder, P.C.

(57) ABSTRACT

An automation network that utilizes motor drives to diagnose faults, and provide potential solutions to a user. The fault status and/or diagnostic remedies may be displayed via a user display integrated with (e.g., in a single cabinet with) the motor drives and/or coupled to (e.g., in an external device separate from) the motor drives. As such, a logic process or other algorithm may be executed by the motor drive to determine a potential set of solutions for any given fault, based on, for example, determined errors and likelihood of causes for presentation to a user. In this manner, motor drives may allow for user corrective actions to be communicated to a user.

29 Claims, 3 Drawing Sheets

ERROR DIAGNOSTICS AND PROGNOSTICS IN MOTOR DRIVES

BACKGROUND

The invention relates generally to the field of fault prevention and failure monitoring for motor drives.

Motor drives may be found in many modern manufacturing plants. Motor drives may include a circuit for driving an electromagnetic machine, such as a brushed or brushless motor, stepper motor, or other electromechanical actuator, which may be internal to or external from the motor drives. In this manner, the motor drives may provide control signals for controlling respective motors. The motor drives may also include components for transforming a voltage and transmitting that voltage to the motor.

In some embodiments, multiple motor drives may be positioned across various parts of a factory or manufacturing site. However, when faults occur in the motor drives and/or in their respective motors, a user may not be able to determine the cause of fault or may not easily be able to determine a solution to remedy the fault. Accordingly, it is now recognized that it is desirable to have a system that would provide fault diagnostics and potential solutions to a user.

BRIEF DESCRIPTION

Present embodiments include an automation network that utilizes motor drives to diagnose faults, and provide potential solutions to a user. Additionally, this reporting of fault status and/or diagnostic remedies may be accomplished via a user display integrated with (e.g., in a single cabinet with) the motor drives and/or coupled to (e.g., in an external device separate from) the motor drives. Specifically, in one embodiment, the display on each motor drive is located in a customer cabinet. The display may aid in debugging or correcting faults of components, particularly on larger machines. Furthermore, a logic process or other algorithm may be executed by the motor drive to determine a potential set of solutions for any given fault, based on, for example, determined errors and likelihood of causes. These solutions may be presented to the user as a single action to be undertaken and/or as a list of actions to be taken to correct the fault. In one embodiment, these solutions may also include information related to the confidence that a particular solution should remedy the problem to further aid a user in performing corrective actions. In this manner, present embodiments may include an interactive display in (or coupled to) the motor drives that may allow for user corrective actions to be communicated to a user.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein to simplify explanation, the disclosure is intended to cover all combinations of these embodiments.

Figure 1:
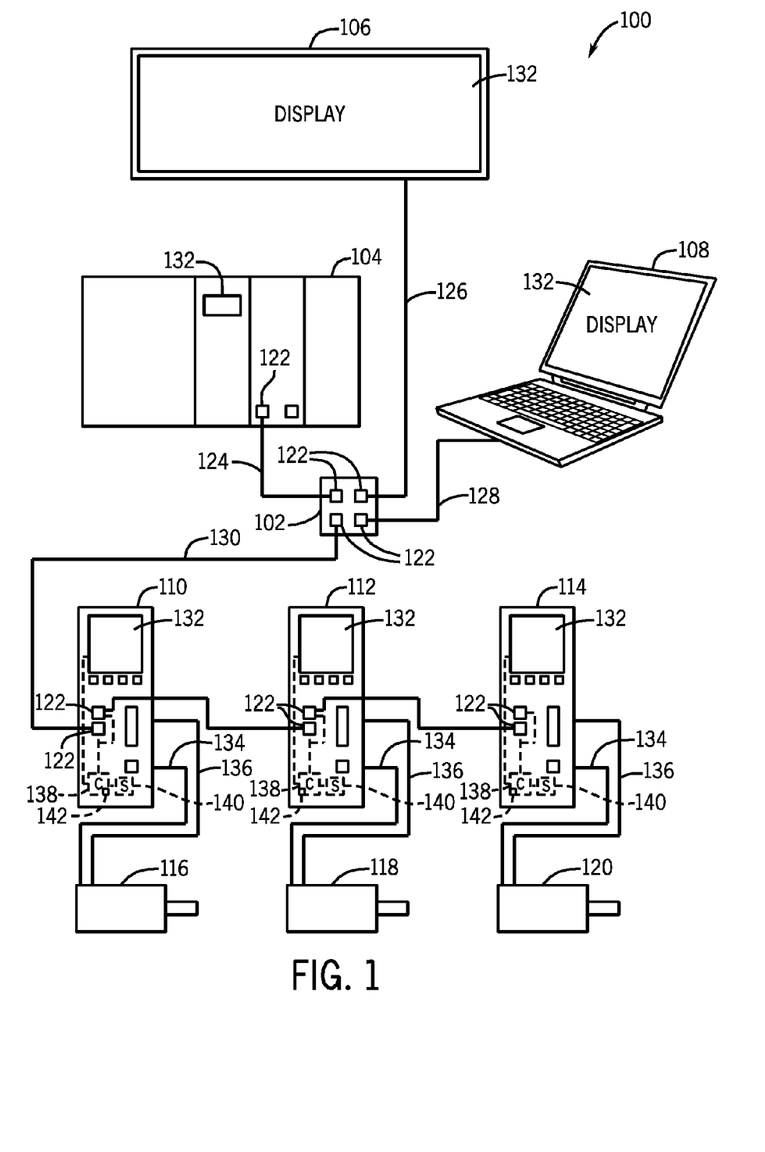
FIG. 1 illustrates a block diagram of an industrial automation network, in accordance with an embodiment.

FIG. 1 illustrates an industrial automation network 100. This industrial automation network 100 may include a network switch 102, a controller 104, a message display device 106, a workstation 108, motor drives 110, 112, and 114, and motors 116, 118, and 120. The network switch 102 may operate to route communications and/or control signals between the controller 104, the message display device 106, the workstation 108, and/or the motor drives 110, 112, and 114. Accordingly, the network interface may include one or more network interfaces 122, each coupled to a respective communication path 124, 126, 128, and 130.

The network interfaces 122 may be utilized to provide communication between the network switch 102, the controller 104, the message display device 106, the workstation 108, and/or motor drives 110, 112, and 114. The network interface 122 may provide communication via a personal area network (PAN) (e.g., Bluetooth), a local area network (LAN) (e.g., Wi-Fi), a wide area network (WAN) (e.g., 3 G or LTE), a near field communication device (NFC), a physical connection (e.g., an Ethernet connection), and/or the like and, as such, may include hardware and software necessary to complete such communications. Furthermore, it is envisioned that communication paths 124, 126, 128, and 130 allow for serial real-time communication system (SERCOS) communications.

The controller 104 may also include a network interface 122 that couples the controller 104 to the network switch along path 124. The controller 104 may be a central controller that generates command and/or control signals for the message display device 106, the workstation 108, and/or the motor drives 110, 112, and 114. The controller 104 may also include a display 132 that is able to display information relating to the operation of the controller 104, the message display device 106, the workstation 108, and/or the motor drives 110, 112, and 114. In some embodiments, the controller 104 may include one or more circuit boards that may include one or more microprocessors, such as one or more "general-purpose" microprocessors, one or more special-purpose microprocessors and/or one or more field-programmable gate arrays (FPGAs) application specific integrated circuits (ASICs), or some combination thereof. Furthermore, the controller 104 may execute one or more algorithms, code, or computer programs, which may be stored on a tangible non-transitory machine readable medium, such as volatile memory (e.g., random access memory), and/or non-volatile memory (e.g. read-only memory). It should be noted that the term non-transitory merely indicates that the medium is not a signal. This memory may be internal to or directly coupled to the controller 104. In some embodiments, the controller 104 may interact with the display device 106 and the workstation 108 to allow for information to be displayed thereon.

Message display device 106 may include a display 132 that functions as a large area message display device. That is, the message display device may be a large display 132 (e.g. a 40 inch display, a 42 inch display, or larger) that allows for information to be displayed to users in a visible location in the automation network 100. The message display device 106 may also be utilized to display, for example, diagnostic display information relating to the operation of one or more motor drives 110, 112, and 114 or motors 116, 118, or 120.

The workstation 108 may be a desktop computer, a laptop computer, a smart phone, a tablet computing device, or any other computing device and may include a display 132. The workstation 108 may allow for a central input mechanism for a user to interface with the remaining elements of the automation network 100, for example, the controller 104, the message display device 106, and/or the motor drives 110, 112, and 114. The workstation may also be able to display on display 132, for example, diagnostic display information relating to the operation of one or more motor drives 110, 112, and 114 or motors 116, 118, or 120.

Each of the motor drives 110, 112, and 116 may include one or more network interfaces 122 that couples the motor drives either to the network switch 102 or to one another. In this manner, control and/or communication signals may be passed between the motor drives 110, 112, and 116 and/or between the motor drives 110, 112, and 116 and the controller 104, the message display device 106, and/or the workstation 108. Each of the motor drives 110, 112, and 114 also may include a display 132 that may display, for example, diagnostic display information relating to the operation of one or more of the motor drives 110, 112, and 114 and/or motors 116, 118, or 120. Each of the motor drives 110, 112, and 114 also may provide power and/or control signals to respective motors 116, 118, and 120 along paths 134 and 136.

The motor drives 110, 112, and 114 may also each include internal components in addition to the network interfaces 122 and display 132. These internal components of the motor drives 110, 112, and 114 may include a controller 138 and storage 140. The controller 138 may include one or more circuit boards that host a controller that may include one or more microprocessors 142, such as one or more "general-purpose" microprocessors, one or more special-purpose microprocessors and/or ASICs, or some combination thereof. Furthermore, the controller 138 execute via the processor 142 one or more algorithms, code, or computer programs, which may be stored on a tangible non-transitory machine readable medium, (i.e., storage 140) such as volatile memory (e.g., random access memory), and/or non-volatile memory (e.g. read-only memory). It should be noted that the term non-transitory merely indicates that the medium is not a signal. This storage 140 may be internal to or directly coupled to the processor 142. In some embodiments, the controller 138 may interact with the network interfaces 122 and the display 132, as well as transmit control signals to a respective motor 116, 118, or 120.

As will be described in greater detail below, one of the algorithms, code, or computer programs run by the controller 138 includes a fuzzy logic program that aids in the diagnosis of faults in the automation network 100, as well as provides weighted solutions to those diagnosed faults. Thus, in general, the controller 138 may receive indications of one or more faults in the automation network 100, the processor 142 may execute code stored in storage 140 to diagnose those faults, and may determine weighted solutions for these faults. The controller 138 may also generate one or more signals corresponding to the diagnosed fault and/or the solution for correcting the fault. Thus, the controller 138 may operate to provide diagnostics and prognostics within a drive system (e.g., automation network 100) that not only indicates what problem/fault exists, but also the underlying problem, and a corrective measure that can be taken to remedy the problem. This may be accomplished through the use of, for example, fuzzy logic in the controller 138 to approximate the likelihood of faults and solutions to provide probabilistic results to a user. One or more signals indicative of these results (i.e., likely faults and likely solutions) may be generated by the controller 138 and provided as inputs to the network interface 122 and/or the display 132.

Moreover, controller 138 may also provide prognostic information that may be generated in response to receiving an operational condition signal indicative of a condition (e.g., indicative of a trend of data or a current value) of a motor 116, 118, or 120 or of the motor drive 110, 112, or 114. This operational condition signal may be analyzed to determine if the motor 116, 118, or 120 or the motor drive 110, 112, or 114 is nearing a fault condition. The controller may also determine a likelihood of a fault occurring based on this analysis of the operational control signal, as well as generate an alarm signal indicative of a likelihood of the determined fault and/or a preventive solution related to the likelihood of the fault. This alarm may be expressed as, for example, an audio alert and/or a visual alert.

Display 132 of the motor drives 110, 112, and 114 may be configured to display information relating to the operation of the motor drives 110, 112, and 114, the operation of one or more of the motors 116, 118, and 120, failures and/or solutions to correct failures of the motor drives 110, 112, and 114 and/or the motors 116, 118, and 120, among other information useful to a user. The display 132 may include a liquid crystal display, an organic light emitting diode display, or any other conventional display type and/or may utilize light emitting diodes to represent information relating to the motor drives 110, 112, and 114 and/or the motors 116, 118, and 120. In the illustrated embodiment, the display 132 is integral with the motor drives 110, 112, and 114 (i.e., housed in a common enclosure).

Returning to the remaining components of the automation network 100, the motor drives 110, 112, and 114 may receive control or communication signals from transmission path 130. Path 130 may also be utilized to transmit operation conditions of the motor drives 110, 112, and 114 and/or the motors 116, 118, and 120, as well as determine likely causes of the failure as well as weighted solutions to the failures. This information may be transmitted to the controller 104, the message display device 106, and/or the workstation 108 for display at locations removed from the motor drives 110, 112, and 114. Accordingly, in one embodiment, the controller 104 and/or the workstation 108 may be used to monitor the health of the automation network 100. Thus, the controller 104 and/or the workstation 108 may receive signals (e.g., a corrective action signal) from the motor drives 110, 112, and 114 related to diagnosed faults and correction actions determined by a controller 138 (i.e., a signal indicative of a fault and a solution to correct the fault). These signals may be utilized to display results on displays 132 so that a user may review the information determined by controller 138 and take corrective actions presented to the user. Thus, each of the controller 104 and/or the workstation 108 may operate as a remote terminal that allows a user to monitor the operation of the motor drives 110, 112, and 114 and/or the motors 116, 118, and 120 remotely.

Figure 2:
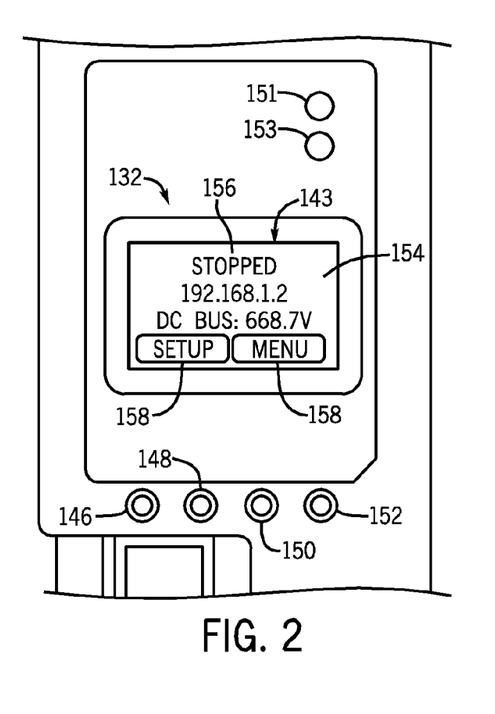
FIG. 2 illustrates a display of FIG. 1, in accordance with an embodiment.

FIG. 2 illustrates one example of the display 132 that may be utilized to provide diagnostic information for the automation network 100 to a user. While display 132 of the motor drives 110, 112, and 114 is illustrated, it may be appreciated that display 132 of, for example, the controller 104, the message display device 106, and/or the workstation 108 may have substantially identical behavior and components as display 132 and, as such, while only display 132 of the motor drives 110, 112, and 114 may be discussed, it may be appreciated that displays 132 of the controller 104, the message display device 106, and/or the workstation 108 may operate in substantially the same manner. Display 132 may include a display screen 143 that may be utilized to display information relating to the operation of one of the motor drives 110 112, and 114 (e.g., motor drive 110), the operation of one or more of the motors 116, 118, and 120 (e.g., motor 116), failures and or corrective actions for the motor drives 110, 112, and 114 and/or the motors 116, 118, and 120, among other information useful to a user. In some embodiments, the display screen 143 may be approximately 20 mm high and 30 mm wide, however, other sizes and dimensions are contemplated. The display screen 143 may include, for example, a liquid crystal display, an organic light emitting diode display, or any other conventional display type. In one embodiment, the display screen 143 may be a touch screen display that allows for user input to be received directly on the display screen 143. In another embodiment, the display 132 may include input structures 146, 148, 150, and 152. Input structures 146, 148, 150, and 152 may allow a user to navigate a displayed user interface or application interface. Non-limiting examples of input structures 146, 148, 150, and 152 may include buttons, sliders, switches, control pads, keys, knobs, scroll wheels, keypads, touchpads, and so forth. Additionally, in certain embodiments, one or more input structures 146, 148, 150, and 152 may be provided together with a touch screen display screen 143. Input structures 146, 148, 150, and 152 may facilitate the interaction of a user with the display 132.

The input structures 146, 148, 150, and 152 may also provide further functionality. For example, the display 132 may be deactivated based on a timer. That is, the display 132, or any component thereof may come on at power up, and stay on for a preset time period, for example, 1 minute, 2 minutes, 5 minutes, or for another period of time. If no input is received during this time period and/or if no changes in the displayed images change during this time period, the display 132 may enter a sleep mode in which nothing is displayed on the display screen 158 (e.g., the display is placed into a sleep mode or turned off). To revive the display 132, a user may provide inputs to the display 132 via input structures 146, 148, 150, and 152 so that images are again displayed on the display screen 143. In another embodiment, the display 132 may automatically be revived upon the detection of an occurrence, such as, a fault event in one or more of the motor drives 110, 112, and 114 and/or one or more of the motors 116, 118, and 120.

Figure 3:
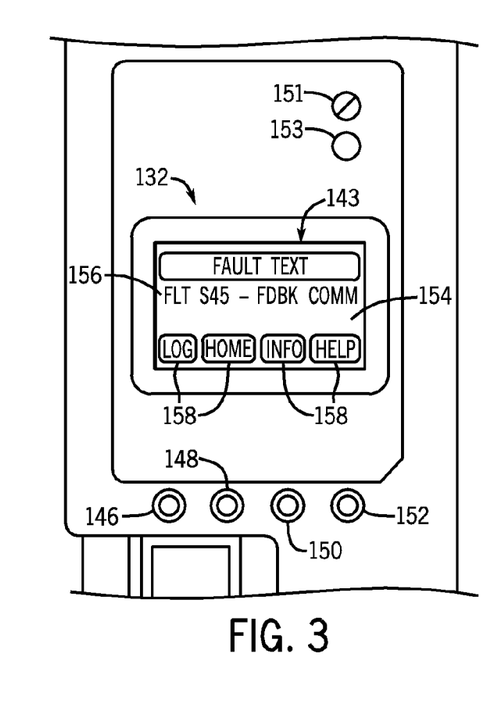
FIG. 3 illustrates a first screen shot of the display of FIG. 3, in accordance with an embodiment.

As illustrated in FIG. 3, the display 132 may display various images generated by an motor drive 110, such as a graphical user interface (GUI) 154 having, for example, text 156 and/or one or more graphical icons such as graphical icon 158. FIG. 3 illustrates an example of an initialization error screen that may occur during the startup of the motor drive 110. As illustrated, the text 156 provides a visual indication of the type of fault that has occurred. Additionally, the graphical icon 158 represents a help button that may allow a user to access additional information relating to the fault represented by the text 156. In some embodiments, the user may access the information related to the graphical icon 158 by interacting with the input structure 152 located directly below the graphical icon 158.

Figure 4:
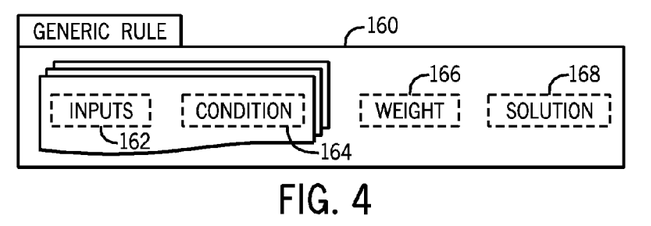
FIG. 4 illustrates a block diagram illustrating rules to be applied by the controller of FIG. 1, in accordance with an embodiment.

Other text 156 and/or graphical icons 158 may be displayed as part of the GUI 154. This other text 156 and/or graphical icons 158 may correspond to faults and solutions to those faults determined by the controller 138 applying fuzzy logic to a set of inputs and rules. FIG. 4 illustrates a block diagram illustrating rules 160 to be applied by the controller 138. The rules 160 may each correspond to a set of information (e.g., a record) stored, for example, in storage 140. The rules 160 may be preset and/or may be configurable by a user and/or by the controller 138. In one embodiment, each rule 160 may include input information 162, condition information 164, weight information 166, and solution information 168. The input information 162 may include information associated with a fault of a component in the automation network 100 (e.g., the type of fault). The condition information 164 may include information associated with circumstances of the fault (e.g., current status of fault, relative status of fault over time, i.e., growing or reducing). The weight information 166 may include information associated with how much weight the controller 138 should give to a given rule 160 when formulating a solution and the solution information 168 may include information associated with a solution to correct a fault for a given rule 160.

It should be noted that the rules 160 may be preloaded into the controller 138. However, in one embodiment, a user may add or modify existing rules 160. For example, for reoccurring faults with successful solutions, a user may modify the weight information 166 of one or more rules 160 to acknowledge the correct prediction of a fault and solution to cure the fault. This may allow for the successful rule 160 to be chosen more often when a similar occurrence arises, since its weight information 166 will have been increased.

This updating may be accomplished, for example, through use of the input structures 146, 148, 150, and 152. A user may utilize the input structures to identify solutions that have correctly resolved a determined fault. This information may be transmitted (for example, as an update rule signal) to the controller 138, whereby the processor 142 may execute code stored in storage 140 to alter a rule 160 corresponding to the rule 160 selected by a user and store the altered (e.g., updated) rule 160 in storage 128. This may allow the controller 138 to update and rank an order list of suggested solutions based on user input. Thus, the rules 160 may be adaptive rules that may allow for quickly identifying "common" machine problems for a given automation network 100.

Additionally, in one embodiment, the rules 160 may be grouped into common problem/solution groups that apply to specific customers. That is, the preprogrammed rules 160 may differ from customer to customer based on the types of devices utilized in a particular network 100 or based on other user and/or manufacturer information. In addition to a user being able to alter a given rule 160 (or a manufacturer of the motor drives 110, 112, and 114 being able to alter a given rule 160 for example, by downloading altered information to the network interface 122), either a supplier of the motor drives 110, 112, and 114 or the user may also add new rules 160 (e.g., via input structures 146, 148, 150, and 152, by downloading new rules 160 to the network interface 122, and/or via new rules 160 stored on a portable storage element such as a thumb drive or a CompactFlash card, which may interface with the motor drives 110, 112, and 114 via a USB connection or another connection). In this manner, a manufacturer of the motor drives 110, 112, and 114 may assist their customer with issues or maintenance specific to a given machine application, or the user may update the system on their own.

The controller 138 may be an "intelligent" system that allows for providing suggested solutions to a user based on a fault indication. For example, a fault may be communicated from one of the motors 116, 118, and 120. This controller 138 may receive this fault indication and match rules 160 that correspond with the received fault indication. Moreover, the controller 138 may pare down the results using, for example, fuzzy logic to rapidly provide a user with suggested solutions to faults instead of simply announcing a list of solutions. For example, the rules 160 may be weighted so that a strength of a provided solution may be viewed by a user (as well as an indication of the fault). This process may be performed by the controller 138 via one or more microprocessors 142, such as one or more "general-purpose" microprocessors, one or more special-purpose microprocessors and/or ASICS, or some combination thereof, executing one or more algorithms, code, or computer programs, which may be stored on a tangible non-transitory machine readable medium, such as storage 140 (e.g., volatile memory, such as random access memory, and/or non-volatile memory, such as read-only memory). Furthermore, the controller 138 may interact with the display 132 and/or with the network interface 122 to display the results on one or both of the display 132 of the motor drive 110, for example, or on the displays 132 elsewhere in the automation network 100. Thus, diagnostic information may be concurrently displayed or may be available for concurrent display in multiple locations of the automation network 100, which may be useful in providing solutions to announced faults to a user.

Thus, the motor drives 110, 112, and 114 may not just present a fault to a user on display 132, but may also display the cause of the problem, and what can be done to fix the problem. This information may be presented in a variety of manners. For example, the information may be represented in a ranked order list of suggested solutions (e.g., a table) that includes confidence levels for the solutions. Additionally or alternatively, information may be represented via a visual indicator, such as a bar graph, differences in text, various colors, or other visual indicators to highlight certain information to a user (e.g., a particular solution to be utilized to correct a fault).

The present motor drives 110, 112, and 114 may be utilized even when hard information regarding a fault is unavailable. For example, the motor drives 110, 112, and 114 may have a "feedback loss" fault condition. The motor drives 110, 112, and 114 via the controller 138 may recognize that there is a loss of signal on transmission path 134 (e.g., a feedback cable) to motor 116, 118, or 120. However, with just this information, the controller 138 may not be able to definitively determine if the fault is due to, for example, a feedback cable which has an open wire or an encoder that has failed because of loose solder joints or bad electronics. Instead of generating signals causing the display 132 to display all potential problems, the controller 138 may operate to indicate the most likely cause of the problem (e.g., due to a bad feedback cable or a bad encoder) and present this information to a user via the display 132. In one embodiment, the controller 138 may use fuzzy logic to make this determination and indication to improve diagnostic ability of the motor drives 110, 112, and 114. Examples of this fuzzy logic technique are illustrated in FIG. 5.

Figure 5:
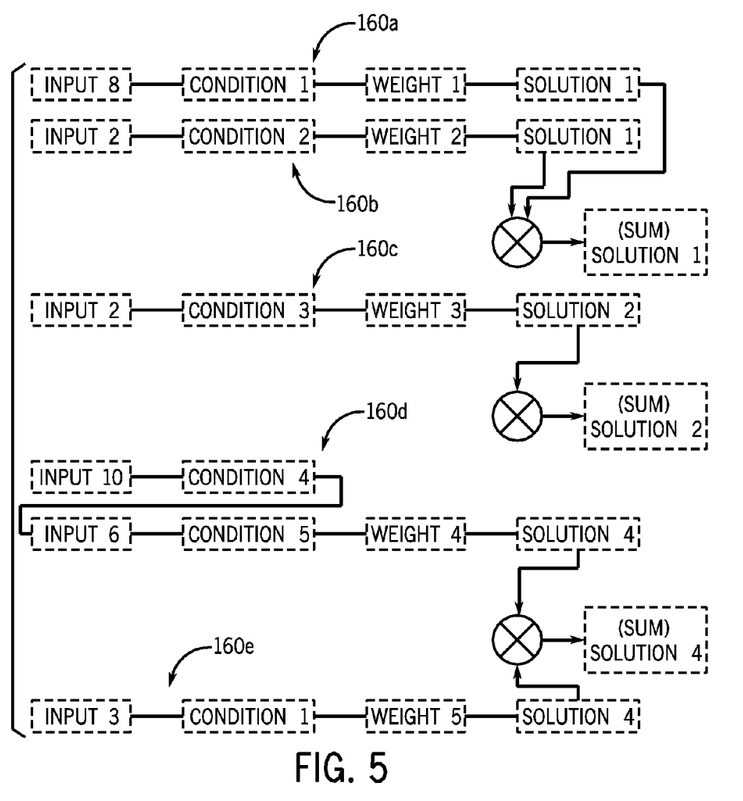
FIG. 5 illustrates examples of applying the rules of FIG. 4, in accordance with an embodiment.

FIG. 5 illustrates examples of application of the fuzzy logic by a controller 138. For example, FIG. 5 illustrates an example of summing two rules, rule 160a and 160b, together when multiple faults have been registered with the same solution. That is, rule 160a includes an input (e.g., input 8) associated with a fault of a component in the automation network 100 (e.g., the type of fault that may be present) and a condition (e.g., condition 1) associated with circumstances of the fault (e.g., current status of fault, relative status of fault over time, i.e., growing or reducing). Additionally rule 160a includes weight information (e.g., weight value 1) associated with how much weight the controller 138 should give to rule 160a when formulating a solution, as well as solution information (e.g., solution 1) associated with a solution to correct a fault. Similarly, rule 160b includes an input (e.g., input 2) associated with a fault of a component in the automation network 100 (e.g., the type of fault that is present) and a condition (e.g., condition 2) associated with circumstances of the fault (e.g., current status of fault, relative status of fault over time, i.e., growing or reducing). Additionally rule 160b includes weight information (e.g., weight value 2) associated with how much weight the controller 138 should give to rule 160b when formulating a solution, as well as solution information (e.g., solution 1) associated with a solution to correct a fault. Thus, as both rules 160a and 160b may be of use for a common solution (e.g., solution 1), the controller 138 may sum the rules 160a and 160b when determining a solution (e.g., solution 1) to present to a user to remedy a recognized fault, thus taking into account both rules 160a and 160b in the formulation of the result.

FIG. 5 also illustrates a situation in which only a single rule 160c is utilized in generating a solution (e.g., solution 2) for output to display 132. That is, an input (e.g., input 2) associated with a fault of a component in the automation network 100 (e.g., the type of fault present) is provided by rule 160c, a condition (e.g., condition 3) associated with circumstances of the fault (e.g., current status of fault, relative status of fault over time, i.e., growing or reducing) is provided by rule 160c, weight information (e.g., weight value 4) associated with how much weight the controller 138 should give to the given rule 160c when formulating a solution, and solution information (e.g., solution 2) associated with a solution to correct the fault. Thus, the controller may only use the information present in rule 160c when determining a solution (e.g., solution 2) to a recognized fault.

FIG. 5 further illustrates an example of summing two rules, rule 160d and 160e, together when multiple faults have been registered with the same solution. However, rule 160d may only be utilized when a first input (e.g., input 10), a first condition (e.g., condition 4), a second input (e.g., input 16), and a second condition (e.g., condition 5) have been met. If these inputs and conditions have been met, then rule 160d with a weight (weight 4) and a solution (e.g., solution 4) may be combined with rule 106e, which includes an input (e.g., input 3) associated with a fault of a component in the automation network 100, a condition (e.g., condition 1) associated with circumstances of the fault (e.g., current status of fault, relative status of fault over time, i.e., growing or reducing), weight information (e.g., weight value 5) associated with how much weight the controller 138 should give to a given rule 160e when formulating a solution, as well as solution information (e.g., solution 4) associated with a solution to correct a fault. Thus, the controller 138 may sum the rules 160d and 160e when determining a solution (e.g., solution 4) to a recognized fault, thus taking into account both rules 160d and 160e in the formulation of the result. Thus, both rules 160d and 160e may be utilized by the controller 138 when determining a solution (e.g., solution 4) to present to a user to remedy a recognized fault.

Thus, by applying modified traditional fuzzy logic (as set forth above), the controller 138 can implement an intelligent diagnostic system that can help identify causes of fault conditions and solutions to solve those problems. Traditional fuzzy logic would suggest that the controller 138 operate on a set of rules 160 to directly control an output. While it is possible to use this type of fuzzy logic for diagnostics in the present controller 138, a modified fuzzy logic engine that runs on similar rules 160 may prove to be more beneficial.

That is, the controller 138 may execute a program to consider a system of rules 160, compare the rules 160 against various inputs, conditions, and weights, and output likelihood of potential solutions. These likelihood solutions may be, for example, summed and ordered, such that the controller 138 system will rank the sum of the solutions and then suggest the solutions with the highest likelihood to be displayed on the display 132. In this manner, the controller 138 may execute a modified fuzzy logic program to generate the potential solutions. An example of this technique of when multiple potential fault causes exist for a given actual fault is described below.

If a feedback cable (e.g., part of or all of transmission path 134 or another path) is disconnected, the controller will recognize numerous potential faults, including "feedback loss" fault, "motor thermal" fault, and "feedback signal loss" fault. This may lead to problems, since, for example, a user might incorrectly diagnose the problem if only the potential faults were listed on the display 132. However, the controller 138 may alleviate this problem. Below are listed conditions that suggest solutions simply based on the faults that are currently active:

TABLE 1

| Rule # | Input | Condition | Weight | Solution |
|---|---|---|---|---|
| 1 | Feedback Loss Fault | Fault Active | 5 | Feedback Cable Break. (Verify feedback cable is connected and undamaged) |
| 2 | Feedback Loss Fault | Fault Active | 4 | Feedback Configuration Incorrect. (Check PLC feedback type configuration against actual feedback type). |
| 3 | Feedback Loss Fault | Fault Active | 2 | Encoder Damaged. (Verify feedback signals at encoder) |
| 4 | Motor Thermal Fault | Fault Active | 5 | Feedback Cable Break (Verify feedback cable is connected and undamaged) |
| 5 | Motor Thermal Fault | Fault Active | 6 | Motor Overheated (Check motor temperature, possible damaged motor) |
| 6 | Feedback Signal Loss Fault | Fault Active | 5 | Feedback Cable Break. (Verify feedback cable is connected and undamaged) |
| 7 | Feedback Signal Loss | Fault Active | 4 | Feedback Cable Impedance High (Verify feedback cable signal line impedance) |
| 8 | Feedback Signal Loss | Fault Active | 4 | Feedback Cable Too Long (Feedback cables must be less than 50 meters) |
| 9 | Feedback Loss Fault | Fault Active | 2 | Encoder Damaged. (Verify feedback signals at encoder) |

This example shows how the use of even extremely simple to implement binary (non-fuzzy) conditions can exploit information about multiple faults to suggest the most probable solution to the problem. When the feedback cable is disconnected, the three previously mentioned faults will be posted (including the misleading motor thermal fault) and all of the rules 160 numbered 1-9 will be active. However after completing execution of the fuzzy logic engine, (e.g., the program stored in storage 140 and executed by processor 142) the controller 138 will formulate the following ranked possibilities for potential problems (listed with the most probable issue at the top):

TABLE 2

| Solution | Likelihood Ranking |
|---|---|
| Feedback Cable Break. (Verify feedback cable is connected and undamaged) | 15 |
| Motor Overheated (Check motor temperature, possible damaged motor) | 6 |
| Encoder Damaged. (Verify feedback signals at encoder) | 4 |
| Feedback Configuration Incorrect. (Check PLC feedback type configuration against actual feedback type). | 4 |
| Feedback Cable Impedance High (Verify feedback cable signal line impedance) | 4 |
| Feedback Cable Too Long (Feedback cables must be less than 50 meters) | 4 |

In one embodiment, the controller 138 may transmit signals indicative of the information of Table 2 to the display 132 for display. Thus, a user may see potential causes of a fault, potential solutions, as well as information related to the likelihood that a particular solution will remedy the problem. Additionally or alternatively examine a relative ratio of likelihood from one solution to the next, as well as discard any solutions which are much less likely than another. That is, there may be a threshold value under which results are discarded.

In a separate instance, there may be no feedback cable break; however, a motor does overheat causing only the motor thermal fault to be recognized. In such an instance, rules 160 corresponding to items 4 and 5 of Table 1 would be active. Thus, the solutions to be output to the display 132 might include the following:

TABLE 3

| Solution | Likelihood Ranking |
|---|---|
| Motor Overheated (Check motor temperature, possible damaged motor) | 6 |
| Feedback Cable Break. (Verify feedback cable is connected and undamaged) | 5 |

Accordingly, the solutions of Table 3 presented to a user on display 132 may be very different from those presented in Table 2. A further example of the operation of the controller 138 includes the inclusion of multiple input information 162 fields and multiple condition information 164 fields for a given rule 160. That is, of inclusion of more advanced data and multiple input/condition pairs can be used to help autonomously problem solve for the user. An example may include determining and troubleshooting position errors of components of the automation network 100. Table 4 illustrates an example of the rules 160 may can be implemented to help determine the problem/solution.

TABLE 4

| Rule # | Input 1 | Condition 1 | Input 2 | Condition 2 | Weight | Solution |
|---|---|---|---|---|---|---|
| 1 | Position Error Fault | Fault Active | Position Error | Continuously Growing Over Time | 10 | Position loop gains incorrect. (Position gains too soft, try increasing proportional gain [Kp]/Position Loop Integral Gain [Ki]) |
| 2 | Position Error Fault | Fault Active | Position Error | Not growing but always just a little under tolerance but eventually trips | 10 | Position error tolerance too tight. (Try increasing position error tolerance, or increasing Ki) |
| 3 | Position Error Fault | Fault Active | Position Command | Unnatural step change | 10 | Position command profile too aggressive. (Verify position command profile in PLC) |

Thus, as seen with respect to the position error example illustrated in Table 4, fuzzy conditions can be used to help distinguish potential solutions to the problem. These fuzzy conditions can be modeled, for example, as small algorithms within the controller (e.g., stored in storage 140 and executed/run by processor 142) to result from specific input data and return a likelihood that a specific condition is met. Because the condition itself is fuzzy, it may be given a weighting factor (e.g., 0→1), and this fuzziness can be used against the known weighting factor to help rank the solutions.

For example, if the problem (fault) was that an error tolerance was set too tight, a position error would occur. In this case, when the controller 138 executes the fuzzy logic algorithm, rule 160 corresponding to number 1 of Table 4 will be evaluated and the data will be analyzed using condition 2 of Table 4. Based on this analysis, the controller 138 should determine that a majority of the time the position error was a high, eventually exceeding a tolerance (or threshold) such that a fault was thrown. In this case the fuzzy logic engine executed by the processor 142 will evaluate rules 160 numbered 1 through 3 of Table 4. For the rule 160 number 1, the "fuzzy" condition 2 will be executed and the controller 138 will examine the pre-fault data and see that the position error did "slightly" increase over time, however not by a very large margin.

Accordingly, condition 2 ("Continuously Growing Over Time") will return a weight for "slightly" weighting value, for example, 0.25. For the rule 160 number 2, the controller will execute condition 2 to again review past data, and may determine from this review that the position error is always very close to the tolerance value. This will cause the generation of a "strong" weighting factor, e.g., approximately 0.80. For the rule 160 numbered 3, the controller will execute condition 2 associated with that rule ("Unnatural step change") and will examine the position command stream. The controller 138 will recognize that no large step change can be seen and, thus, may generate a weighting factor for "very unlikely" (e.g., approximately 0.1). Therefore in the present example, the solutions generated by the controller 138 would read as follows:

TABLE 5

| Solution | Likelihood Ranking |
|---|---|
| Position error tolerance too tight. (Try increasing position error tolerance, or increasing Ki) | 8 |
| Position loop gains incorrect. (Position gains too soft, try increasing Kp/Ki) | 2.5 |
| Position command profile too aggressive. (Verify position command profile in Logix) | 1 |

Thus, if the motor drives 110, 112, and 114 encountered a "position error" fault, as discussed above, the controller could identify not only the "position error" fault, but also identify that it is most likely due to control loop gains, and suggest potential fixes (such as, modifying the Kp term or modifying the Ki term). Thus, with this available information, the user would need relatively little knowledge of the system to design, build, and maintain the system. In fact, with this information the user would rarely need to open a manual or call customer service to help assist them since all the data they are looking for would be available directly. That is, all of this advanced diagnostic and prognostic information would be available directly on the display 132 so that a designer or machine operator would not need any special equipment to identify and remedy problems. Thus, the display 132 may allow a user to identify and resolve faults more rapidly, which may decrease the downtime of the motor drives 110, 112, and 114 and/or motors 116, 118, or 120 thus allowing for greater plant efficiencies.

While only certain features of the invention have been illustrated and described herein, many modifications and changes will occur to those skilled in the art. It is, therefore, to be understood that the appended claims are intended to cover all such modifications and changes as fall within the spirit and scope of this disclosure.

The invention claimed is:
1. A motor drive, comprising:
a controller configured to generate a control or communication signal for transmission to a component of an automation system coupled to the motor drive; and an interface configured to receive from the component an operational condition signal indicative of a fault in the component, wherein the controller comprises a processor configured to:
  analyze the operational control signal;
  access at least one rule comprising input information of a type of fault of the component;
  determine a likelihood of a solution to remedy the fault causing the operational control signal utilizing the at least one rule; and
  generate a weighted likelihood ranking value to be displayed on a display, wherein the weighted likelihood ranking value is related to the likelihood of the solution to correct the fault, wherein the weighted likelihood ranking value is generated utilizing weight information of the at least one rule.

2. The motor drive of claim 1, wherein the controller is configured to generate a correction action signal indicative of the solution to correct the at least one fault.

3. The motor drive of claim 2, comprising the display, wherein the controller is configured to determine a correction action based on the correction action signal to be provided on the display.

4. The motor drive of claim 3, comprising a housing enclosing the interface, the controller, and the display.

5. The motor drive of claim 2, wherein the interface is configured to transmit the correction action signal to a device external to the motor drive, wherein the device comprises a display, wherein the controller is configured cause an indication of the correction action signal to be provided on the display.

6. The motor drive of claim 2, wherein the controller comprises a storage element configured to store first information relating to the input information associated with the type of fault of the component.

7. The motor drive of claim 6, wherein the storage element is configured to store second information relating to a condition associated with the fault of the component.

8. The motor drive of claim 7, wherein the storage element is configured to store third information relating to the weight information.

9. The motor drive of claim 8, wherein the storage element is configured to store fourth information relating to a corrective action associated with the fault of the component.

10. The motor drive of claim 1, wherein the processor is configured to determine the likelihood of at least one second fault causing the control signal.

11. The motor drive of claim 10, wherein the controller is configured to generate a correction action signal indicative of a first and a second solution to correct the at least one fault.

12. The motor drive of claim 11, wherein the controller is configured to determine an order for display of the first and the second solution to correct the at least one fault.

13. The motor drive of claim 1, wherein the processor is configured to determine a likelihood of at least one fault causing the operational control signal based on an application of fuzzy logic principles.

14. A motor drive, comprising:
  a controller configured to receive an operational condition signal indicative of a fault in the motor drive, wherein the controller comprises:
    a processor configured to:
      select at least one rule from a set of rules applicable to the fault;
      determine a likelihood of a solution to remedy the fault based on information stored in conjunction with the at least one rule; and
      generate a weighted likelihood ranking value to be displayed on a monitor, wherein the weighted likelihood ranking value is related to the likelihood of the solution to remedy the fault, wherein the weighted likelihood ranking value is generated utilizing weight information of the at least one rule; and
    storage configured to store the set of rules.

15. The motor drive of claim 14, comprising at least one user input configured to receive inputs from a user related to alteration of one or more rules of the set of rules.

16. The motor drive of claim 14, comprising at least one user input configured to receive inputs from a user related to the addition of a new rule to the set of rules.

17. The motor drive of claim 14, comprising a network interface configured to receive signals from a user or from a manufacturer of the motor drive related to alteration or addition of one or more rules of the set of rules.

18. The motor drive of claim 14, comprising an interface configured to be coupled to a portable storage element to receive information related to alteration or addition of one or more rules of the set of rules.

19. The motor drive of claim 14, comprising a network interface configured to transmit an indication of the weighted likelihood ranking value to the monitor as external to the motor drive.

20. The motor drive of claim 14, wherein the processor is configured to determine a likelihood of the solution based on an application of fuzzy logic principles.

21. The motor drive of claim 14, wherein the controller is configured to receive a second operational condition signal indicative of a fault in a motor, wherein the processor is configured to select at least one second rule from a set of rules applicable to the fault in the motor and determine a likelihood of a solution to remedy the fault in the motor based on information stored in conjunction with the at least one second rule.

22. A motor drive, comprising:
  a controller configured to generate a control or communication signal for transmission to a motor of an automation system coupled to the motor drive;
  an interface configured to receive an operational condition signal indicative of a fault in motor; wherein the controller comprises a processor configured to:
    analyze the operational control signal;
    access at least one rule comprising input information of a type of fault of the component;
    determine a likelihood at least one fault causing the control signal utilizing the at least one rule;
    determine a likelihood of a solution to remedy the fault based on the likelihood of the at least one fault causing the control signal utilizing the at least one rule; and
    generate a weighted likelihood ranking value, wherein the weighted likelihood ranking value is related to the likelihood of the solution to remedy the fault, wherein the weighted likelihood ranking value is generated utilizing weight information of the at least one rule; and
  a display, wherein the controller is configured cause an indication of the solution to be provided on the display in conjunction with the weighted likelihood ranking value.

23. The motor drive of claim 22, wherein the indication of the solution comprises a graph, a table, or a chart.

24. The motor drive of claim 22, wherein the processor is configured to determine a likelihood of a second solution to remedy the fault based on the likelihood of at least one second fault causing the control signal indication.

25. The motor drive of claim 24, wherein the indication of the solution comprises a ranked list comprising an ordered preference of the first solution and the second solution.

26. The motor drive of claim 25, wherein the processor is configured to determine the indication of the solution based on an application of fuzzy logic principles.

27. A motor drive, comprising:
   a controller configured to generate a control or communication signal for transmission to a component of an automation system coupled to the motor drive and receive an operational condition signal indicative of a condition of the component or of the motor drive, wherein the controller comprises a processor configured to:
   analyze the operational control signal;
   access at least one rule comprising input information of a type of fault of the component;
   determine a likelihood of a solution to remedy a fault causing the operational control signal utilizing the at least one rule; and
   generate a weighted likelihood ranking value to be displayed on a display, wherein the weighted likelihood ranking value is related to a likelihood of the solution to correct the fault, wherein the weighted likelihood ranking value is generated utilizing weight information of the at least one rule.

28. The motor drive of claim 27, wherein the controller is configured to generate an alarm signal indicative of a likelihood of the fault.

29. The motor drive of claim 27, wherein the controller is configured to generate an alarm signal indicative of a preventive solution related to a likelihood of the fault.

* * * * *